A. KÖNIG.
GUN BORE SIGHTING TELESCOPE.
APPLICATION FILED FEB. 1, 1908.
953,696.
Patented Apr. 5, 1910.
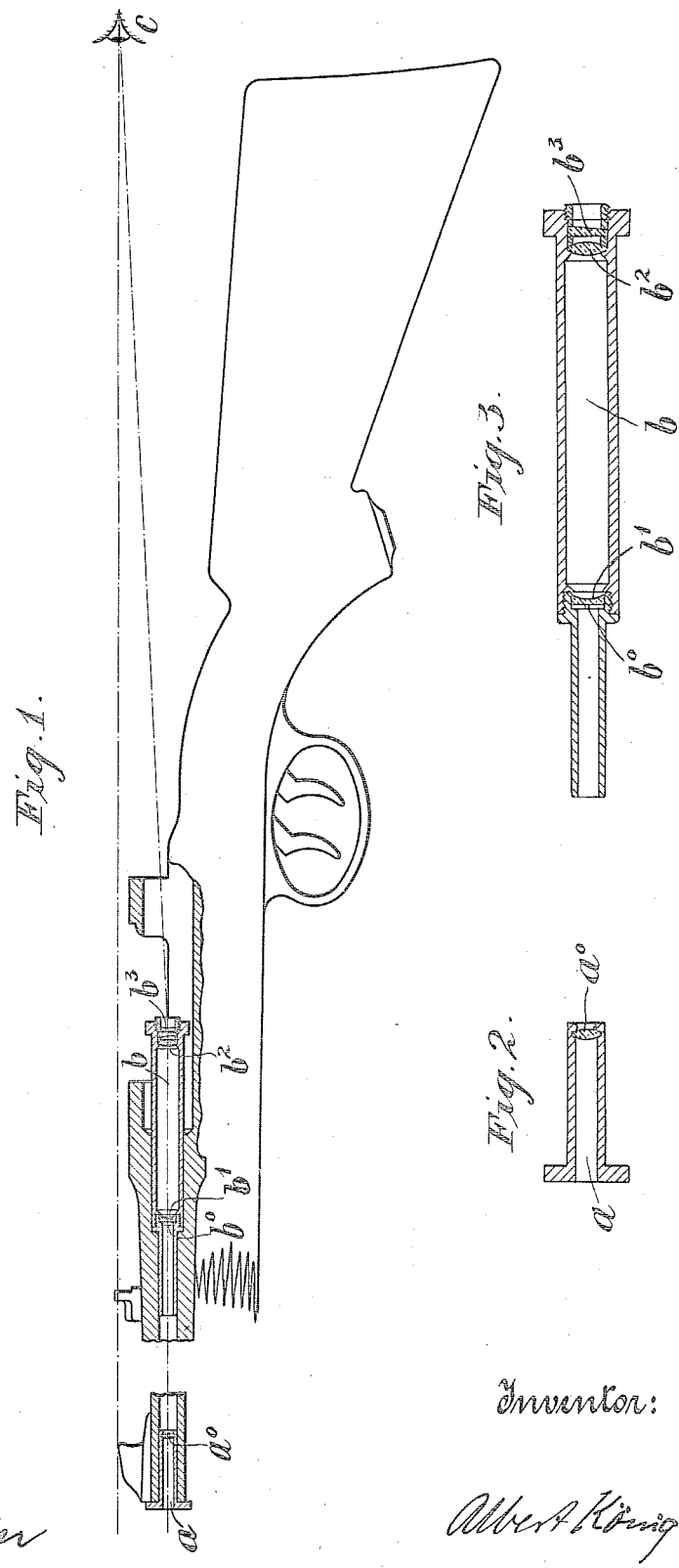

UNITED STATES PATENT OFFICE.

ALBERT KÖNIG, OF JENA, GERMANY, ASSIGNOR TO THE FIRM OF CARL ZEISS, OF JENA, GERMANY.

GUN-BORE SIGHTING-TELESCOPE.

953,696.  Specification of Letters Patent.  Patented Apr. 5, 1910.

Application filed February 1, 1908. Serial No. 413,791.

*To all whom it may concern:*

Be it known that I, ALBERT KÖNIG, doctor of philosophy, a citizen of the German Empire, and residing at Carl-Zeiss strasse, Jena, in the Grand-Duchy of Saxe-Weimar, Germany, have invented a new and useful Gun-Bore Sighting-Telescope, of which the following is a specification.

The invention relates to gun bore sighting telescopes for adjusting the sighting device proper of the gun or for testing such adjustment, which is correct when the line of aim of the gun sighting device in its zero position is parallel to the axis of the bore. A telescope of this kind is therefore adapted to be inserted into the bore of the gun with its line of sight parallel to the axis of the bore, so that in the condition of correct adjustment just defined this line may be substituted for the bore axis. Adjusting the gun sighting device is then effected by setting the line of aim of this device to its zero position, directing the gun until a very distant point lies in the line of sight of the bore telescope and varying the position of the gun sighting device until its line of aim likewise includes the very distant point. The telescopic bore insertion piece may widely vary in size, according to whether it is designed for ordnance or for machine guns, rifles and other small arms. According to the present invention, in the said optical appliances to be inserted into a gun, the direction of inspection of the ocular is inclined so that the eye-point lies approximately in the line of aim of the sighting device proper of the gun. For this purpose an ocular having an obtusely broken axis is employed, so that the hinder part of this axis may intersect the said line of aim. The advantage of this new arrangement consists in that—by a more rapid succession of the two observations, the one with the telescope of the insertion piece and the other with the sighting device proper, which must be repeated alternately when the observer is to be enabled to adjust exactly the gun sighting device—a more reliable comparison of these observations is rendered possible. Formerly the head or even the entire body had to be moved in changing from one observation to the other, whereby more time is wasted and, moreover, the attention required for the observations to be compared is more likely to be impaired than by merely moving the eye for changing the direction of vision as in the improved arrangement.

In the annexed drawing: Figure 1 is a longitudinal section through a Mauser rifle equipped with an insertion piece according to the invention. Fig. 2 is a longitudinal section on an enlarged scale through the objective portion of the insertion piece. Fig. 3 is a longitudinal section on an enlarged scale through the ocular portion of the insertion piece.

In the example as shown the insertion piece consists of two portions, an objective portion $a$ inserted into the muzzle, and an ocular portion $b$ inserted into the loading chamber. The principal optical components are the usual ones: in the objective portion $a$, the objective $a^0$; in the ocular portion $b$, the cross-wires $b^0$, the field-lens $b^1$ and the eye-lens $b^2$. The inclination of the direction of inspection of the ocular, which raises the eye-point $c$ into the line of aim of the gun sighting device, is in the example shown effected by a refracting prism $b^3$ supposed to form a separate optical component and to be located behind the eye-lens $b^2$. Thus the axis of the complete ocular $b^1$ $b^2$ $b^3$ in this case is obtusely broken in the prism $b^3$. This prism might also be replaced by a reflecting prism, suitably one which has the effect of erecting the image at least in the vertical direction.

I claim:

An optical appliance comprising an objective, an ocular, the axis of which is obtusely broken, and a sighting mark arranged in the focal plane common to both the objective and the ocular, this appliance being adapted to be inserted into the bore of a gun with its line of sight parallel to the axis of the bore and with the hinder part of its ocular axis intersecting the line of aim of the sighting device.

ALBERT KÖNIG.

Witnesses:
 PAUL KRÜGER,
 FRITZ SANDER.